Patented Apr. 30, 1929.

1,711,087

UNITED STATES PATENT OFFICE.

THOMAS HARBISON DONAHUE AND FREDERICK F. FRICK, OF ANACONDA, MONTANA.

FLOTATION AGENTS, PROCESS OF PREPARING THEM, AND PROCESS OF USING THE SAME.

No Drawing.    Application filed May 3, 1926. Serial No. 106,544.

This invention relates to a new product which may be used for concentrating minerals from ores by flotation. The object of the invention is the provision of new and useful flotation reagents, a process for preparing the same, and the use of such reagents in flotation processes.

We have discovered that a very effective flotation reagent is produced by treating an aqueous solution of a xanthate with an excess of chlorine, either by absorbing chlorine gas in excess in the xanthate solution or by mixing an excess of chlorine water with the xanthate solution. The resulting product is the same in both cases and is a white emulsion. The xanthate solution may be a solution of a dry xanthate salt or one prepared by mixing a water solution of an alkali, an alcohol and carbon disulphide. The white emulsions produced by any of these methods are equally effective as flotation reagents.

Any xanthate salt regardless of the method by which it is produced may be used in the preparation of the white emulsion. The xanthate salt may be formed from any alkali, especially from the alkali metal hydroxides, and from any alcohol such as methyl, ethyl, butyl and propyl alcohols. The invention is not limited to the use of any particular strength of chlorine water or xanthate solution. These solutions may be used in varying strengths and proportions.

The method of producing the white emulsions is illustrated by the following examples:

1. To one part by weight of caustic soda is added 1.4 parts by weight of ethyl alcohol diluted with an equal volume of water. When the caustic soda is in solution 1.9 parts by weight of carbon disulphide are slowly added with constant stirring. The temperature is kept below 38° C. The product, an aqueous solution of sodium xanthate, is diluted to about 20 grams of sodium xanthate per liter, and to it is added chlorine water, containing 5 grams of chlorine per liter, in excess. A white emulsion is formed which is a very effective flotation reagent when added to an ore pulp and which may be used immediately as such without any further treatment.

2. A similar white emulsion is formed when an excess of chlorine water, containing about 5 grams of chlorine per liter, is mixed with a solution of sodium xanthate containing 10–50 grams of sodium xanthate per liter.

3. Chlorine gas and a solution containing 20 grams of sodium xanthate per liter, are passed continuously through a mechanical mixer and agitator, at such controlled rates that the product, the white emulsion already described, contains no sodium xanthate but does contain a slight excess of free chlorine.

In a copending application Ser. No. 104,454, filed April 24, 1926, we have described and claimed xanthic disulphides as flotation reagents. In that application xanthic disulphides are described as being formed by the action of chlorine or iodine on the xanthates according to the following reaction:

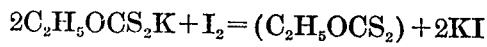

$$2C_2H_5OCS_2K + I_2 = (C_2H_5OCS_2) + 2KI$$

As stated in the above copending application, we have prepared ethyl xanthic disulphide by the use of iodine and found the product to conform to its description in the literature. The product melted at 28° C. and the theoretical amount of iodine entered into the reaction. However, when chlorine was used we obtained a product which did not conform to the above description. For example, when chlorine water is added to an aqueous solution of potassium xanthate, free xanthate is present until twice the amount of chlorine required by the reaction

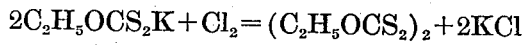

$$2C_2H_5OCS_2K + Cl_2 = (C_2H_5OCS_2)_2 + 2KCl$$

has been added, and no test for free chlorine is obtained until this amount is added. We have also found that when twice the theoretical amount of chlorine is used, hydrochloric acid equivalent to half the chlorine is formed. The above reaction does not yield hydrochloric acid. The product is a liquid at least down to 0° C. whereas xanthic disulphide solidifies at 28° C. The chemical constitution of this product is not definitely known but it has been prepared repeatedly and its effectiveness as a flotation reagent has been repeatedly demonstrated. We are satisfied that the product made by the use of an excess of chlorine is not xanthic disulphide.

The white emulsions of this invention may be used as flotation reagents with ores generally. They may be added to the pulp during grinding in the ball mills or to the pulp just before flotation or during flotation. They may be used in acid, alkaline, or neutral flotation pulps. They may also be used along with other flotation reagents. In general, pine oil is used to advantage as a frother. Other oils such as tar oils may be used to stabilize the froth and aid in the recovery of the minerals. The white emulsions are used in varying quantities; some ores require a smaller amount, while others require a greater quantity. One pound of the reagent per ton of ore is generally sufficient.

The effectiveness of these flotation reagents is shown by the following tests. The white emulsion and pine oil were used in the first test and pine oil alone in the second test.

|  | White emulsion. | Pine oil. |
|---|---|---|
| Feed: % cu | 1.83 | 1.84 |
| Concentrate: % cu | 10.17 | 6.65 |
| Middling: % cu | 2.31 | 5.57 |
| Tailing: % cu | .16 | .86 |
| % Recovery of copper in concentrate | 82.2 | 29.4 |
| % Recovery of copper in concentrate and middling | 93.3 | 62.3 |
| Reagents, #s/ton: |  |  |
| Sulphuric acid | 15.0 | 15.0 |
| White emulsion | (*) | ---- |
| Pine oil | 1.0 | 1.0 |

(*) Made from .3 pounds per ton ore, of sodium xanthate. Sufficient excess chlorine water was used to give a test for free chlorine.

We claim:

1. The process of producing an emulsion which is suitable for use as a flotation reagent, which comprises treating an aqueous xanthate solution with an excess of chlorine.

2. The process of producing an emulsion which is suitable for use as a flotation reagent, which comprises treating an aqueous xanthate solution with an excess of chlorine gas.

3. The process of producing an emulsion which is suitable for use as a flotation reagent, which comprises treating an aqueous alkali metal ethyl xanthate solution with an excess of chlorine.

4. As a new product, the emulsion formed by treating an aqueous xanthate solution with an excess of chlorine.

5. As a new product, the emulsion formed by treating an aqueous xanthate solution with an excess of chlorine gas.

6. As a new product, the emulsion formed by treating an aqueous alkali metal ethyl xanthate solution with an excess of chlorine gas.

7. A process of concentrating minerals from ores by froth flotation, which comprises adding to the ground ore an emulsion formed by treating an aqueous xanthate solution with an excess of chlorine, and subjecting the final mixture to a froth flotation operation.

8. A process of concentrating minerals from ores by froth flotation, which comprises adding to the ground ore an emulsion formed by treating an aqueous xanthate solution with an excess of chlorine gas, and subjecting the mixture to a froth flotation operation.

9. The process of concentrating minerals from ores by froth flotation, which comprises adding to the ground ore an emulsion formed by treating an aqueous alkali metal ethyl xanthate solution with an excess of chlorine gas, and subjecting the mixture to a froth flotation operation.

10. The process of producing an emulsion which is suitable for use as a flotation reagent, which comprises treating an alkali metal ethyl xanthate solution with an excess of chlorine gas.

11. As a new product, the emulsion formed by treating an aqueous alkali metal ethyl xanthate solution with an excess of chlorine.

12. The process of concentrating minerals from ores by froth flotation, which comprises adding to the ground ore an emulsion formed by treating an aqueous alkali metal ethyl xanthate solution with an excess of chlorine, and subjecting the mixture to a froth flotation operation.

In testimony whereof, we affix our signatures.

THOMAS HARBISON DONAHUE.
FREDERICK F. FRICK.